(12) United States Patent
Vasadi et al.

(10) Patent No.: US 9,172,303 B2
(45) Date of Patent: Oct. 27, 2015

(54) POWER MANAGEMENT UNIT SYSTEMS AND METHODS

(75) Inventors: Sriharsha Vasadi, Bangalore (IN); Ankit Seedher, Bangalore (IN); Shyam Somayajula, Bangalore (IN)

(73) Assignee: STMICROELECTRONICS INTERNATIONAL N.V., Geneva (CH)

(*) Notice: Subject to any disclaimer, the term of this patent is extended or adjusted under 35 U.S.C. 154(b) by 1146 days.

(21) Appl. No.: 13/048,100

(22) Filed: Mar. 15, 2011

(65) Prior Publication Data
US 2012/0080945 A1     Apr. 5, 2012

Related U.S. Application Data
(60) Provisional application No. 61/416,810, filed on Nov. 24, 2010.

(51) Int. Cl.
*G05F 1/00* (2006.01)
*H02M 3/158* (2006.01)
*H02M 1/00* (2007.01)

(52) U.S. Cl.
CPC ........ *H02M 3/158* (2013.01); *H02M 2001/009* (2013.01); *Y10T 307/406* (2015.04)

(58) Field of Classification Search
CPC ..................................................... H02M 3/158
USPC ......... 323/222, 224, 265, 266, 267, 271, 272, 323/282–286, 331
See application file for complete search history.

(56) References Cited

U.S. PATENT DOCUMENTS
5,617,015 A    4/1997   Goder et al.
6,087,816 A *   7/2000   Volk .............................. 323/282
(Continued)

FOREIGN PATENT DOCUMENTS
WO    2008042447 A2    4/2008
WO    2009138505 A1    11/2009

OTHER PUBLICATIONS
M. Belloni, et al.; "On the Design of Single-Inductor Double-Output DC-DC Buck, Boost and Buck-Boost Converters"; University of Plavia; Pavia, Italy; 15th IEEE Int'l Conference on Electronics, Circuits and Systems; Aug. 31-Sep. 3, 2008; pp. 626-629.
(Continued)

*Primary Examiner* — Adolf Berhane
*Assistant Examiner* — Afework Demisse
(74) *Attorney, Agent, or Firm* — Allen, Dyer, Doppelt, Milbrath & Gilchrist, P.A.

(57) ABSTRACT

Systems and methods provide for a power management unit and its operation. The power management unit includes: a step-down power converter configured to receive a first voltage and output a second voltage, wherein the second voltage is less than the first voltage and at least one step-up power converter configured to receive the second voltage and output a third voltage, wherein the third voltage is greater than the second voltage. It also includes an inductive element connected to the step-down power converter and the at least one step-up power converter and configured to store energy and selectively release the stored energy, wherein the inductive element is time shared by both the step-down power converter and the at least one step-up power converter; and a finite state machine configured to control the time sharing of the inductive element.

25 Claims, 12 Drawing Sheets

(56) References Cited

U.S. PATENT DOCUMENTS

| | | | | |
|---|---|---|---|---|
| 6,469,478 | B1* | 10/2002 | Curtin | 323/266 |
| 7,078,882 | B2* | 7/2006 | Weng et al. | 323/224 |
| 7,723,965 | B2* | 5/2010 | Lesso et al. | 323/225 |
| 7,782,027 | B2* | 8/2010 | Williams | 323/266 |
| 7,977,927 | B2* | 7/2011 | Williams | 323/266 |
| 8,354,828 | B2* | 1/2013 | Huang et al. | 323/267 |
| 2006/0284606 | A1* | 12/2006 | Chen et al. | 323/259 |
| 2008/0278002 | A1 | 11/2008 | Platania et al. | |
| 2009/0102439 | A1* | 4/2009 | Williams | 323/266 |
| 2010/0194344 | A1 | 8/2010 | Greyling | |

OTHER PUBLICATIONS

M. Huang, et al.; "Single Inductor Multi-Output (SIMO) DC-DC Converters With High Light-Load Efficiency and Minimized Cross-Regulation for Portable Devices"; IEEE Journal of Solid-State Circuits; vol. 44, No. 4; Apr. 2009.

D. Kwon, et al.; "Single-Inductor-Multiple-Output Switching DC-DC Converters"; Department of Electronics, ; IEEE Transactions on Circuits and Systems II: Express Briefs; vol. 56, No. 8; Aug. 2009.

Dongsheng Ma et al: "Enabling Power-Efficient DVFS Operations on Silicon", IEEE Circuits and Systems Magazine, IEEE Service Center, New York, NY, US, vol. 10, No. 1, Jan. 2010, pp. 14-30, XP011304722, ISSN: 1531-636X.

* cited by examiner

POWER MANAGEMENT UNIT SYSTEMS AND METHODS

RELATED APPLICATION

This non-provisional patent application is related to, and claims priority based upon, U.S. Provisional Patent Application Ser. No. 61/416,810, filed on Nov. 4, 2010, entitled "Power Management Unit", and Indian Provisional Patent Application Serial No. IN 2909/CHE/2010 filed on Sep. 30, 2010 entitled "Power Management Unit", the disclosures of which are expressly incorporated here by reference.

TECHNICAL FIELD

The embodiments of the subject matter disclosed herein generally relate to power management units.

BACKGROUND

Ongoing technological developments have led to an increasing number of portable, battery-operated electronic products which in turn is generating a growing demand for energy efficient, low-power power supplies. Such products are either intrinsically low-powered or incorporate so-called "idle" or "sleep" modes of operation during which power consumption is reduced significantly compared to the power consumption of such products during their normal operating mode. Many such products generate multiple regulated direct current (DC) voltages derived from one common internal or external power source, such as a battery or a power adaptor, to comply with the power requirements of the products' internal subsystems. For example, a power supply voltage could have a voltage of 12 volts, however, an internal subsystem, e.g., a processor, might need only 2 volts. Two conventionally used devices for obtaining a desired voltage for an internal subsystem from a power supply are a step-down DC-DC power converter which is also known as a buck convertor, or a step-up DC-DC power converter which is also known as a boost converter.

The conventional buck converter 100 will now be described with respect to FIG. 1. The buck converter 100 includes a feedback amplifier 102, a finite state machine (FSM) 104, switch $S_p$ 106, switch $S_n$ 108, inductor 114 and a capacitor 116. Feedback amplifier 102 compares a sensed proportion of the output voltage, shown as Output Sense 110, with a reference voltage $V_{ref}$ 112 and provides a control input to the FSM 104 based upon the comparison. Based on the received control input, the FSM 104 drives switches $S_p$ 106 and $S_n$ 108. When switch $S_p$ 106 is closed and switch $S_n$ 108 is open, the input voltage $V_{dd}$ 120 goes through the inductor 114 substantially without ohmic loss and charges capacitor 116. When switch $S_p$ 106 is open and switch $S_n$ 108 is closed, the buck converter 100 maintains a circulating charge to Ground 118. A typical example of an output voltage obtained from a conventional buck converter 100 can be $V_{out}$=1.2 Volts when the source voltage $V_{dd}$=5.5 Volts.

The conventional boost converter 200 will now be described with respect to FIG. 2. The boost converter 200 includes a feedback amplifier 202, a FSM 204, switch $S_p$ 206, switch $S_n$ 208, an inductor 210 and a capacitor 212. The feedback amplifier 202 compares a sensed proportion of the output voltage, shown as Output Sense 214, with a reference voltage $V_{ref}$ 216 and provides a control input to the FSM 204 based upon the comparison. Based on the received control input, the FSM 204 drives switches $S_p$ 206 and $S_n$ 208. When switch $S_n$ 208 is closed and switch $S_p$ 206 is open, the current flows from the input voltage $V_{dd}$ 218 through inductor 210 to ground 220. The amount of the current and the correspondingly stored energy in the inductor 210 increases over the time for which $S_n$ 208 remains closed. When switch $S_n$ 208 is open and switch $S_p$ 206 is closed, the energy stored in the inductor 210 can be transferred to the capacitor 212 and/or a load at the output 222 of the boost converter 200. A typical example of an output voltage obtained from a conventional boost converter 200 can be $V_{out}$=6.5 Volts when the source voltage $V_{dd}$ 218 is 3.6 Volts.

In conventional designs of buck converters 100 and boost converters 200, as described above, each converter uses its own dedicated inductor 114, 210. Each inductor 114, 210 is relatively expensive and also occupies scarce circuit board real-estate. For applications which require multiple, regulated DC voltages derives from a common internal or external power source, such as a battery or a power adaptor, these cost and space issues can become aggravated.

Accordingly, systems and methods for improving the use of power converters which use inductors are desirable.

SUMMARY

Exemplary embodiments describe using a power management unit in, for example, cellular communication devices, cellular communication subsystems, battery powered tracking devices, and the like. By using the exemplary power management unit systems and methods described herein, an object of providing more efficient power management can be obtained.

According to an exemplary embodiment there is a power management unit including: a step-down power converter configured to receive a first voltage and output a second voltage, wherein the second voltage is less than the first voltage and at least one step-up power converter configured to receive the second voltage and output a third voltage, wherein the third voltage is greater than the second voltage. The power management unit also includes an inductive element connected to the step-down power converter and the at least one step-up power converter and configured to store energy and selectively release the stored energy, wherein the inductive element is time shared by both the step-down power converter and the at least one step-up power converter; and a finite state machine (FSM) configured to control the time sharing of the inductive element.

The step-down power converter may include a first switch which, when closed, outputs the second voltage to the at least one step-up power converter when a second switch is open. The FSM may be further configured to send control signals to open and close the first and second switches. The at least one step-up power converter may include a third switch which, when closed, outputs the third voltage from the at least one step-up power converter when a fourth switch is open. The FSM may be further configured to send control signals to open and close the third and fourth switches. The power management may also include a capacitor connected to the inductive element and configured to receive and store an electrical charge. At least one of the power converters may operate in a discontinuous mode. Additionally, the step-down power converter and each of the at least one step-up power converters may include an FSM.

According to another exemplary embodiment there is a power management unit including: a step-down power converter configured to receive a first voltage and output a second voltage, wherein the second voltage is less than the first voltage, the step-down power converter including: a first feedback amplifier configured to compare a sensed proportion of the second voltage with a first reference voltage and configured to provide a first control input to a first finite state machine (FSM) based upon the comparison; and the first FSM configured to synchronize a time sharing of an inductive element with a second FSM. The power management unit also includes at least one step-up power converter configured to receive the second voltage and output a third voltage, wherein the third voltage is greater than the second voltage, the at least one step-up power converter including: a second feedback amplifier configured to compare a sensed proportion of the third voltage with a second reference voltage and configured to provide a second control input to the second FSM upon the comparison; and the second FSM configured to synchronize the time sharing of the inductive element with the first FSM. Additionally, the power management unit includes an inductive element connected to the step-down power converter and the at least one step-up power converter and configured to store energy and selectively release the stored energy, wherein the inductive element is time shared by both the step-down power converter and the at least one step-up power converter.

The power management unit may include a linear regulator connected to the at least one step-up power converter and configured to generate an output voltage. The step-down power converter may include a first switch which, when closed, outputs the second voltage to the at least one step-up power converter when a second switch is open. The first FSM may be further configured to send control signals to open and close the first and second switches. The step-up power converter may include a third switch which, when closed, outputs the third voltage from the at least one step-up power converter when a fourth switch is open. The second FSM may be further configured to send control signals to open and close the third and fourth switches. The power management also may include a capacitor connected to the inductive element and configured to receive and store an electrical charge. Additionally, at least one of the power converters may operate in a discontinuous mode.

According to another exemplary embodiment there is a method for operating a power management unit. The method includes: receiving, by a step-down power converter, a first voltage and outputting a second voltage, wherein the second voltage is less than the first voltage; receiving, by at least one step-up power converter, the second voltage and outputting a third voltage, wherein the third voltage is greater than the second voltage. The method also includes storing, by an inductive element, energy and selectively releasing the stored energy, wherein the inductive element is time shared by both the step-down power converter and the at least one step-up power converter; and controlling, by a finite state machine (FSM), the time sharing of the inductive element.

The method for operating a power management unit also may include closing a first switch and opening a second switch in the step-down power converter which outputs the second voltage to the at least one step-up power converter and sending control signals, by the FSM, to open and close the first and second switches. The method also may include closing a third switch and opening a fourth switch in the at least one step-up power converter which outputs the third voltage from the at least one step-up power converter and sending control signals, by the FSM, to open and close the third and fourth switches. Additionally, the method may include receiving and storing an electrical charge by a capacitor, operating at least one of the power converters in a discontinuous mode and wherein the step-down power converter and each of the at least one step-up power converters includes an FSM.

According to another exemplary embodiment there is another method for operating a power management unit. The method includes: receiving, by a step-down power converter, a first voltage and outputting a second voltage, wherein the second voltage is less than the first voltage; comparing, by a first feedback amplifier within the step-down power converter, a sensed proportion of the second voltage with a first reference voltage and providing a first control input to a first finite state machine (FSM) within the step-down power converter based upon the comparison; synchronizing, by the first FSM within the step-down power converter, a time sharing of an inductive element with a second FSM; and receiving, by a step-up power converter, the second voltage and outputting a third voltage, wherein the third voltage is greater than the second voltage. The method also includes comparing, by a second feedback amplifier within at least one step-up power converter, a sensed proportion of the third voltage with a second reference voltage and providing a second control input to a second FSM within the at least one step-up power converter based upon the comparison; synchronizing, by the second FSM within the at least one step-up power converter, a time sharing of an inductive element with the first FSM; and storing, by an inductive element, energy and selectively releasing the stored energy, wherein the inductive element is time shared by both the step-down power converter and the at least one step-up power converter.

The method for operating a power management unit also may include generating, by a linear regulator, an output voltage, closing a first switch and opening a second switch in the step-down power converter which outputs the second voltage to the at least one step-up power converter and sending control signals, by the FSM, to open and close the first and second switches. Additionally, the method also may include closing a third switch and opening a fourth switch in the at least one step-up power converter which allows the third voltage to exit the at least one step-up power converter and sending control signals, by the FSM, to open and close the third and fourth switches. Also the method may include receiving and storing an electrical charge by a capacitor and operating at least one of the power converters in a discontinuous mode.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to exemplary embodiments described below, it is possible to improve the efficiency of power management units and methods for their use in various devices, e.g., cellular communication devices, cellular communication subsystems, battery powered tracking devices, and the like. The various exemplary embodiments described herein illustrate different systems and methods which can be used alone or in combination depending upon the desired application for improving the efficiency of power management units.

Figure 1:
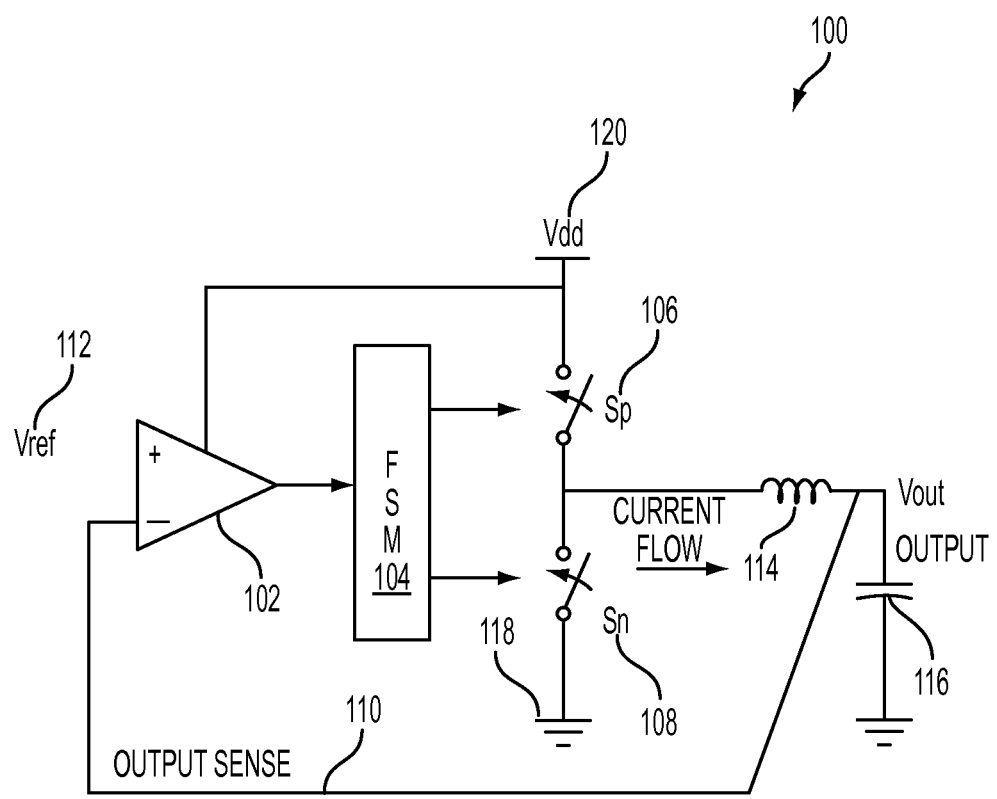
FIG. 1 illustrates a schematic representation of a conventional buck converter.
Figure 2:
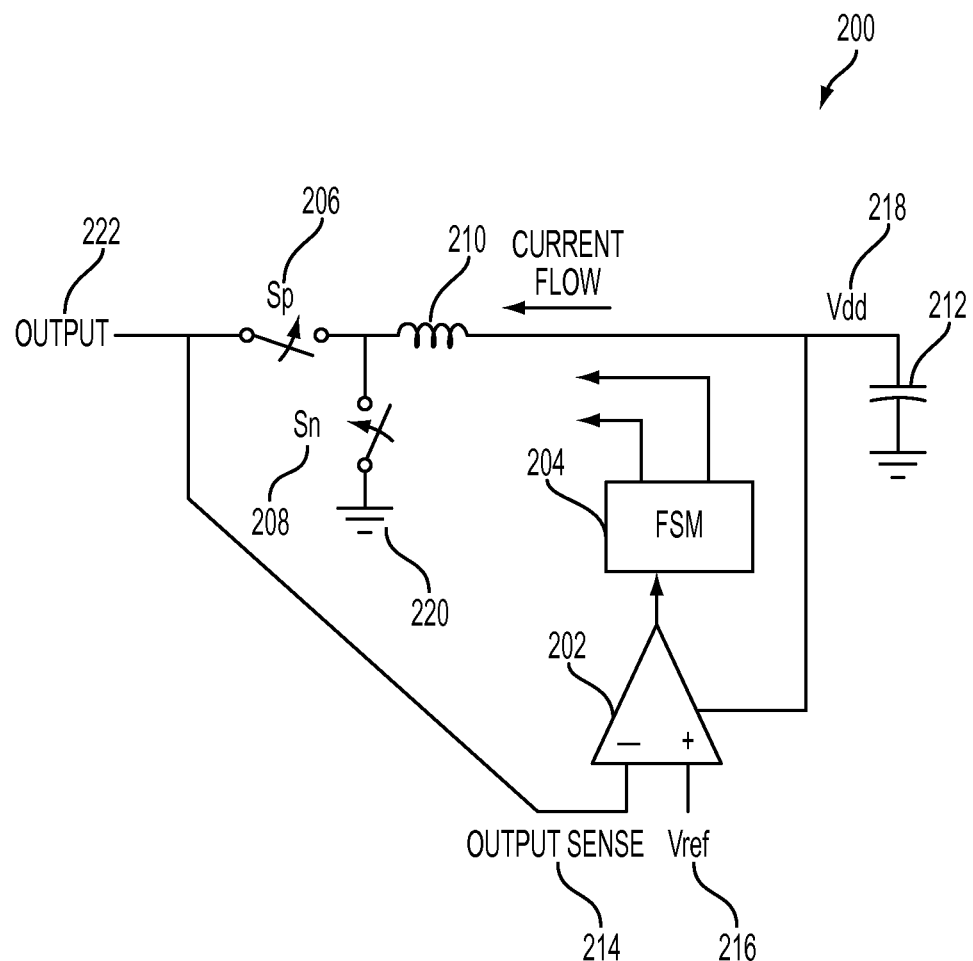
FIG. 2 shows a schematic representation of a conventional boost converter.
Figure 3:
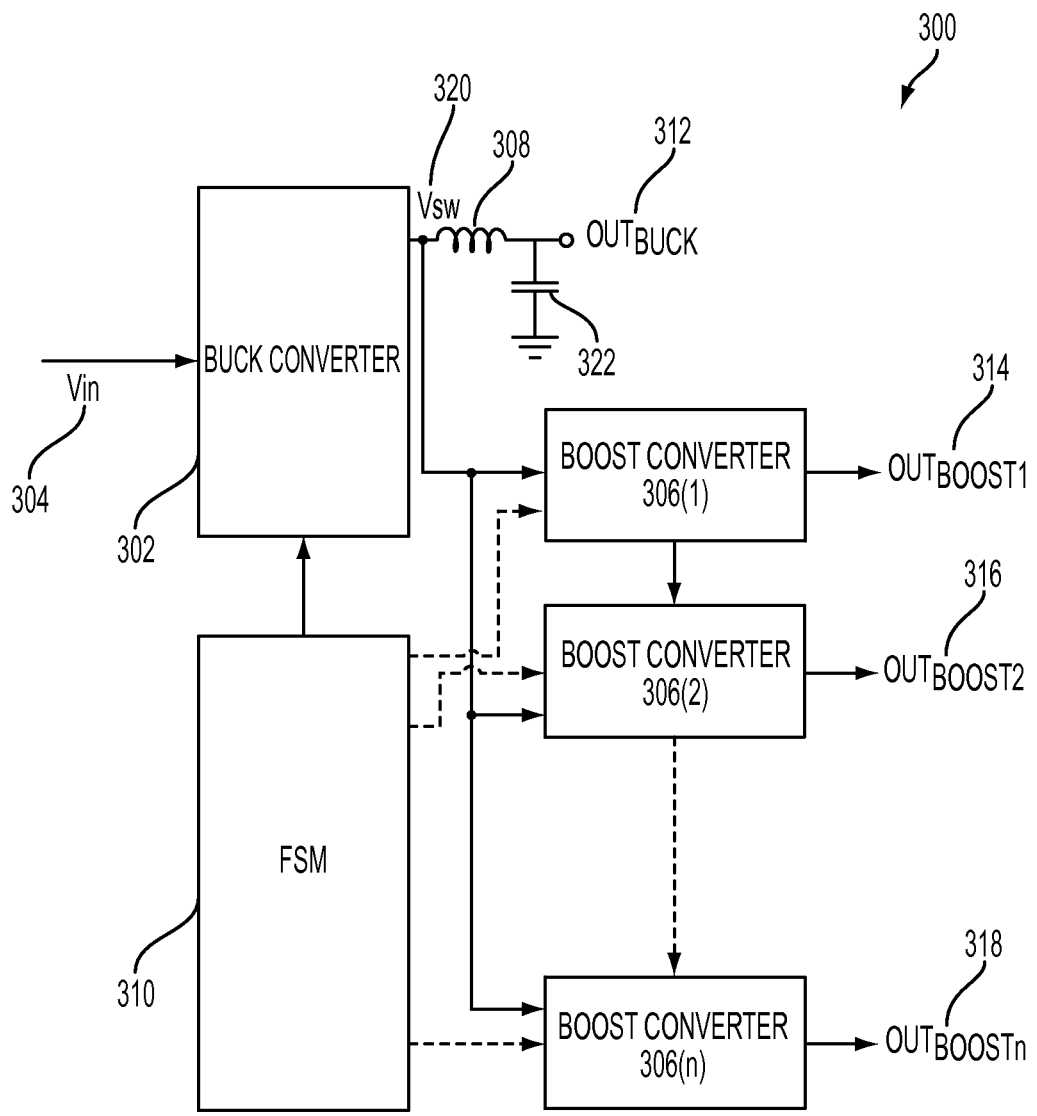
FIG. 3 illustrates a block diagram representation of a power management unit according to exemplary embodiments.

According to an exemplary embodiment, a block diagram representation of an exemplary power management unit 300 is shown in FIG. 3. The power management unit 300 includes a step-down power converter, e.g., a buck converter 302, which can be configured to receive a supply voltage $V_{in}$ 304 and one or more step-up power converters, e.g., boost converters 306(1), 306(2) . . . 306(n), which have their respective inputs coupled to a switching output of the buck converter 302. A single inductive element 308, e.g., an inductor, can be included which can be shared for use by all of the converters 302, 306(1), 306(2) . . . 306(n) in a time multiplexed arrangement. Additionally, the inductive element 308 is coupled to a switching output $V_{sw}$ 320 and a capacitor 322. The power management unit 300 also includes a finite state machine (FSM) 310 which can be configured to provide control signals to enable the time multiplexed sharing of the common inductive element 308 between the various converters 302, 306(1), 306(2) . . . 306(n). This time multiplexed sharing of the common inductive element 308 is described in more detail below.

According to an exemplary embodiment, the buck converter 302 is configured to output voltage $OUT_{buck}$ 312, which has a lower voltage than the received supply voltage $V_{in}$ 304. The boost converters 302(1), 302(2) . . . 302(n) can be configured to output voltages $OUT_{boost1}$ 314, $OUT_{boost2}$ 316 . . . $OUT_{boostn}$ 318, associated with the boost converters 302(1), 302(2) . . . 302(n) respectively, which output voltages are greater than the voltage $OUT_{buck}$ 312. According to an alternative exemplary embodiment, each converter 302, 306(1), 306(2) . . . 306(n) can have a dedicated FSM 310 which may be synchronized to provide the time multiplexed control of the common inductive element 308. According to another alternative exemplary embodiment, one or more FSMs 310 can be shared between two or more power converters.

Figure 4A:
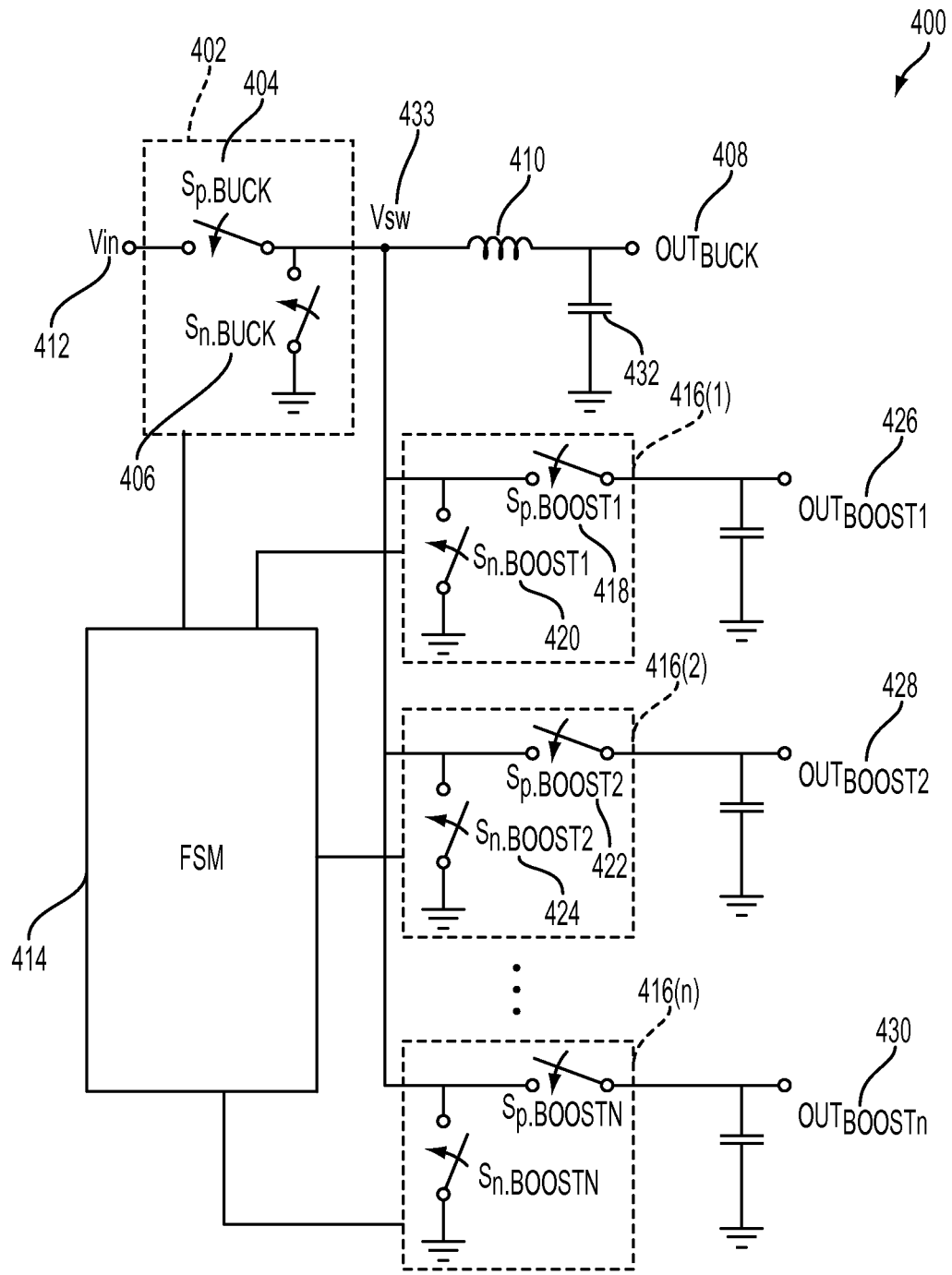
FIG. 4(a) shows a schematic representation of a power management unit according to exemplary embodiments.
Figure 4B:
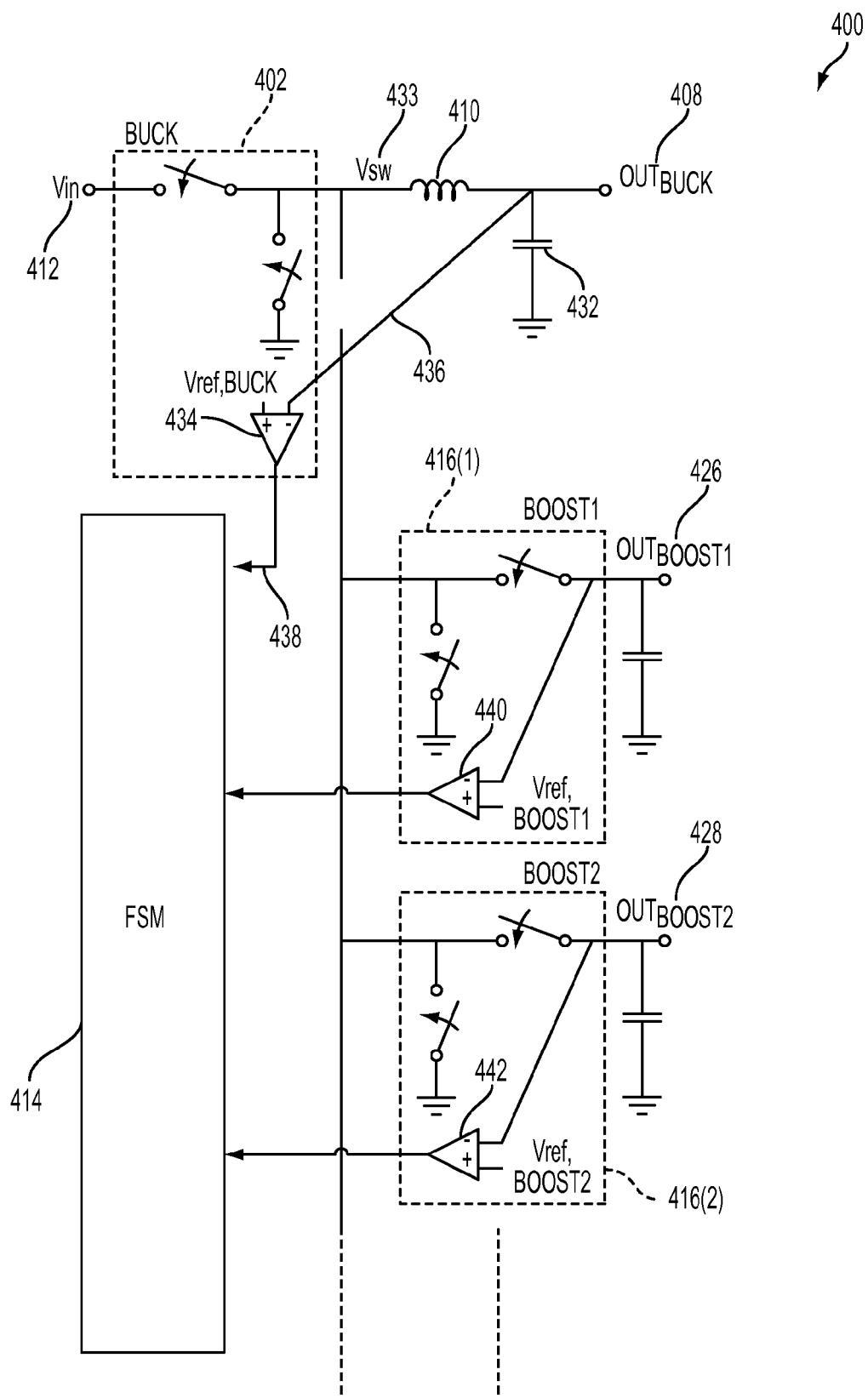
FIG. 4(b) shows the power management unit of FIG. 4(b) including a plurality of feedback amplifiers according to exemplary embodiments.

According to another exemplary embodiment, the operation of another power management unit 400 is now described with respect to FIG. 4. The power management unit 400 includes a buck converter 402 and one or more boost converters 416(1), 416(2) . . . 416(n). The buck converter 402 includes switch $S_{p,buck}$ 404 and switch $S_{n,buck}$ 406, and can provide an output $OUT_{buck}$ 408 through a common inductive element 410, e.g., an inductor, which can store and release energy. The common inductive element 410 is connected to a switching node $V_{sw}$ 433 and a capacitor. According to an exemplary embodiment, when operating in relatively low power modes of operation, the switching converters in the power management unit 400 can operate in a discontinuous mode, i.e., the inductive element 410 will be completely discharged at the end of the commutation cycle. When switch $S_{p,buck}$ 404 is closed, and all other switches shown in FIG. 4 are open, current flows into an output $OUT_{buck}$ 408 from the input voltage $V_{in}$ 412 through the inductive element 410. When the current in the inductive element 410 exceeds a predetermined limit, e.g., 200 mA-400 mA, the FSM 414 opens the switch $S_{p,buck}$ 404 and closes the switch $S_{n,buck}$ 406. Upon opening the switch $S_{p,buck}$ 404 and closing the switch $S_{n,buck}$ 406 the current, previously stored in the inductive element 410, leaves the inductive element 410 with a rate which can be described as having a constant slope. When the inductive current becomes substantially zero, the FSM 414 opens the switch $S_{n,buck}$ 406 and makes the inductive element 410 available for use by the boost converters 416(1), 416(2) . . . 416(n).

According to exemplary embodiments, the inductive element 410 may be used in a sequential manner by the boost converters 416(1), 416(2) . . . 416(n). The FSM 414 can then close switch $S_{p,boost1}$ 418 of boost converter 416(1) while all of the remaining switches in the power management unit 400 remain open. The FSM 414 can then open switch $S_{p,boost1}$ 418 and close switch $S_{n,boost1}$ 420 of boost converter 416(1) while all of the remaining switches remain open in the power management unit 400. The FSM 405 can then close $S_{n,boost1}$ 420, thus making the inductive element 410 available for use in turn for the remaining boost converters 416(2) . . . 416(n). Subsequently, the FSM 414 can close switch $S_{p,boost2}$ 422 of boost converter 416(2) while all of the remaining switches in the power management unit 400 remain open. The FSM 414 can then open $S_{p,boost2}$ 422 and turn on $S_{n,boost2}$ 424 of the boost converter 416(2) while all of the remaining switches are still open. The FSM 414 can continue this pattern of switch management in the rest of the boost converters as desired, which allows for the time multiplexed sharing of the inductive element 410. This in turn can provide regulated output voltages for $OUT_{boost1}$ 426, $OUT_{boost2}$ 428 . . . $OUT_{boostn}$ 430.

According to an alternative exemplary embodiment, other forms of time sharing of the inductive element 410 can be used. For example, instead of providing the inductive element 410 to the converters sequentially, the inductive element 410 can be provided to the converters on an as needed basis, preferably with the buck converter 402 having the highest priority. This can be done by having the feedback amplifiers associated with each converter transmit a signal to the FSM 414 indicating the converter's desire to use the inductive element 410. For example, referring to FIG. 4(b), the buck converter feedback amplifier 434 receives as an input 436 the output voltage of the buck converter 402. When the output voltage falls below its reference voltage, a signal 438 is transmitted to the FSM 414 which indicates that the buck converter 402 desires to use the inductive element 410. The boost converters 416(1) and 416(2) have their respective feedback amplifiers 440 and 442 which can operate in a similar manner.

The FSM 414 receives these signals and can then provide control signals to the various switches in the converters 402, 416(1) and 416(2) to allocate the inductive element 410 as desired.

Figure 5A:
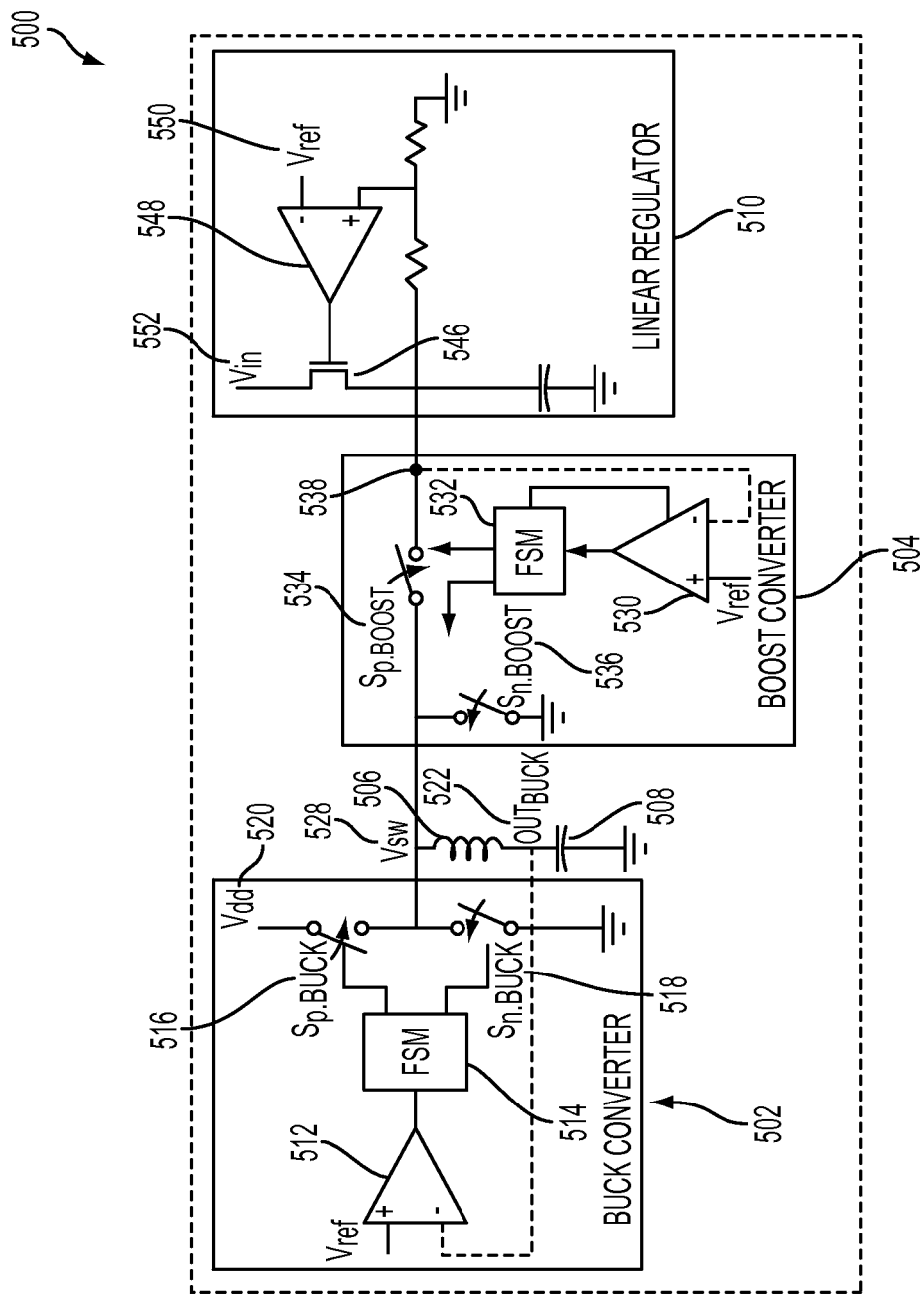
FIG. 5(a) illustrates a schematic representation of another power management unit according to exemplary embodiments.
Figure 5B:
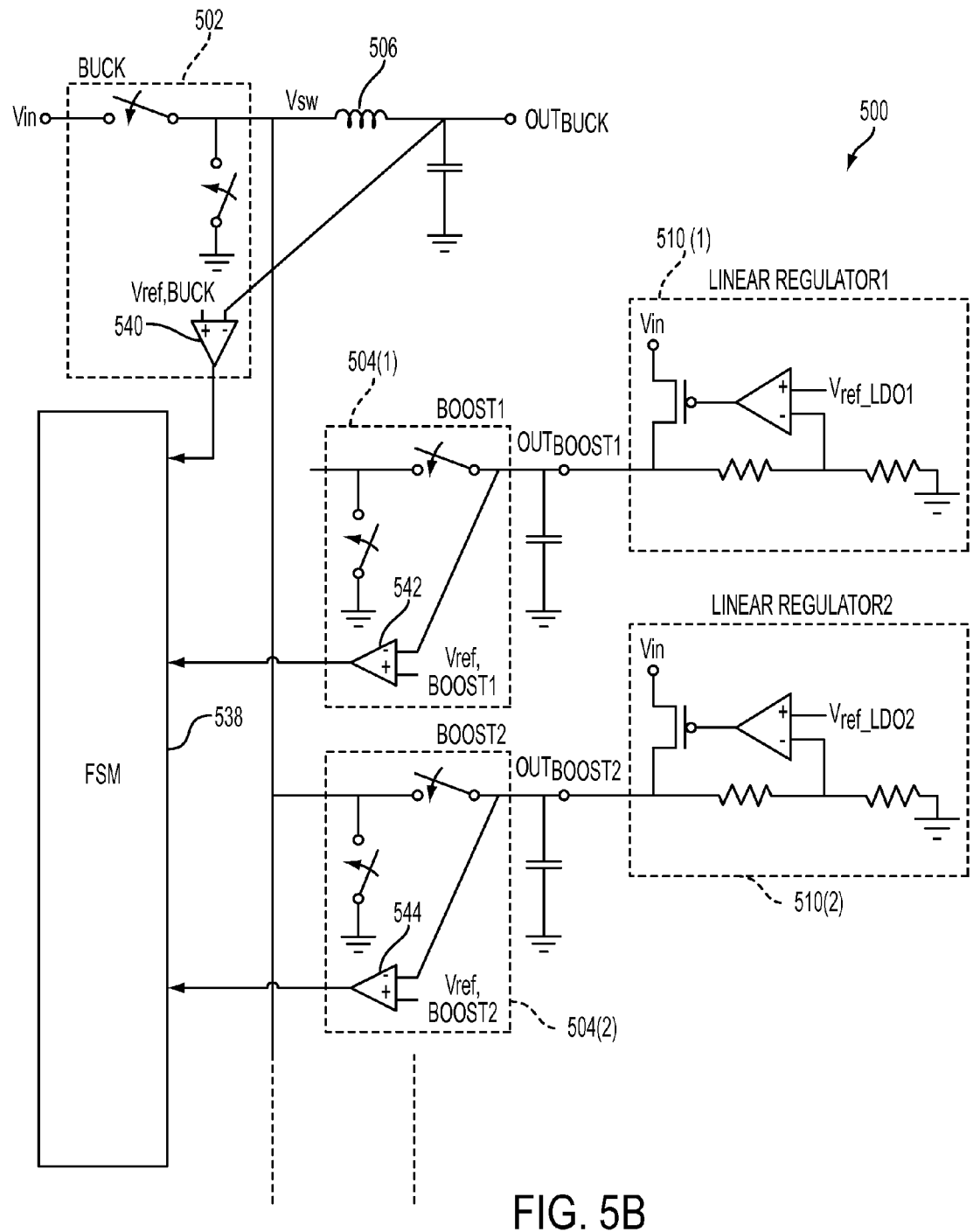
FIG. 5(b) shows the power management unit of FIG. 5(a) including a plurality of boost converters and linear regulators according to exemplary embodiments.

According to another exemplary embodiment, FIG. 5 illustrates a schematic representation of another power management unit 500 which can facilitate operation during relatively low power consumption, e.g., sleep mode of operation of a system such as a cellular phone, and can also facilitate operation during relatively high power consumption, e.g., operating in an active mode of a system such as a cellular phone. The power management system 500 can include a buck converter 502, a boost converter 504, a commonly shared inductive element 506 and a capacitor 508 which is connected in series to the inductive element 506. The power management 500 unit can also include a linear regulator 510 which may, for example, operate during the active mode of operation of the system.

The buck converter 502 can include a feedback amplifier 512, an FSM 514, a switch $S_{p,buck}$ 516 and a switch $S_{n,buck}$ 518. The buck converter 502 receives a supply voltage $V_{dd}$ 520 which is also used by the feedback amplifier 512 within the buck converter 502. When switch $S_{p,buck}$ 516 is closed, current flows to an output through the inductor 506 to provide an output voltage OUT$_{buck}$ 522 of the buck converter 502. The output voltage OUT$_{buck}$ 522 can be fed back to one input (the negative input) of the feedback amplifier 512, while a reference voltage $V_{ref}$ 524 is supplied to another input (the positive input) of the feedback amplifier 512. Feedback amplifier 512 compares a sensed proportion of the output voltage with a reference voltage $V_{ref}$ 524 and provides a control input to the FSM 102 based upon the comparison. A switching output $V_{sw}$ 526 can be provided for use as an input voltage to the boost converter 504.

According to exemplary embodiments, the boost converter 504 can include a feedback amplifier 530, an FSM 532, a switch $S_{p,boost}$ 534 and a switch $S_{p,boost}$ 536. Upon receiving $V_{sw}$ 526 as the input voltage to the boost converter 504, the boost converter 504 can provide an output OUT$_{boost}$ 538 when switch $S_{p,boost}$ 534 is closed. This output voltage OUT$_{boost}$ shown as point 538 can then be delivered to the linear regulator 510. The linear regulator 510 can be configured to facilitate operation of the power management unit 500 under relatively high current load requirements by generating an output voltage as desired. For example, in some exemplary embodiments, a load profile of the buck converter 502 may not be predictable. Therefore, the boost converter 504 may not be guaranteed availability of the common inductive element 506 at all times that the boost converter 504 may desire use of the common inductive element 506. This can occur when the buck converter 502 is using the common inductive element 506 which in turn prevents the function of the boost converter 504. Therefore, in some exemplary embodiments, the linear regulator 510 may be functional at all (or many) times.

Regarding the linear regulator 510, the linear regulator 510 includes a feedback amplifier 548, and a p-type metal oxide semiconductor field effect transistor 546 to drive current from the input supply $V_{in}$ 552 to an output. As the boost converter 504 is in operation, the boost converter's output voltage OUT$_{boost}$ shown as point 538 is slightly higher than the reference voltage $V_{ref}$ 550 of the linear regulator 510. This creates the situation where the feedback amplifier's output is high enough to turn off the p-type metal oxide semiconductor field effect transistor 546 and hence the linear regulator 510 as well. When the boost converter 504 is turned off in, for example, relatively high power conditions, the output voltage drops as neither the boost convertor 504 nor the linear regulator 510 are driving the output voltage high enough. When the output voltage drops below a scaled proportion of the linear regulator's $V_{ref}$ 550 the linear regulator, which may be a low-dropout linear regulator, turns on substantially immediately.

According to another exemplary embodiment, the power management unit 500 shown in FIG. 5(*a*) can be expanded to include a plurality of boost converters 504(1), 504(2) and linear regulators 510(1), 510(2) as shown in FIG. 5(*b*). Time sharing of the inductive element 506 can be done by having the feedback amplifiers 540, 542, 544 associated with each converter transmit a signal to the FSM 538 indicating the converter's desire to use the inductive element 506. While shown in FIG. 5(*b*) as there being a single FSM 538, each converter 502, 504(1) and 504(2) can have its own FSM 538 (similar to what is shown in FIG. 5(*a*)). The FSM 538 (or FSMs which can communicate with each other) can provide control signals to the various switches in the converters 502, 504(1) and 504(2) to allocate the inductive element 506 as desired.

According to another exemplary embodiment, the buck converters 302, 402 and 502 can be given the highest priority for access to their respective common inductive elements 308, 410 and 506. In support of this prioritization, the FSM or FSMs 310, 414, 514 and 532 can be configured such that when the buck converters 302, 402 and 502 require the use of their respective inductive element 308, 410 and 506, for use according to the exemplary embodiments associated with FIGS. 3-5, the other boost converters 306, 416 and 504 are prevented from accessing their respective common inductive element 308, 410 and 506.

Figure 6:
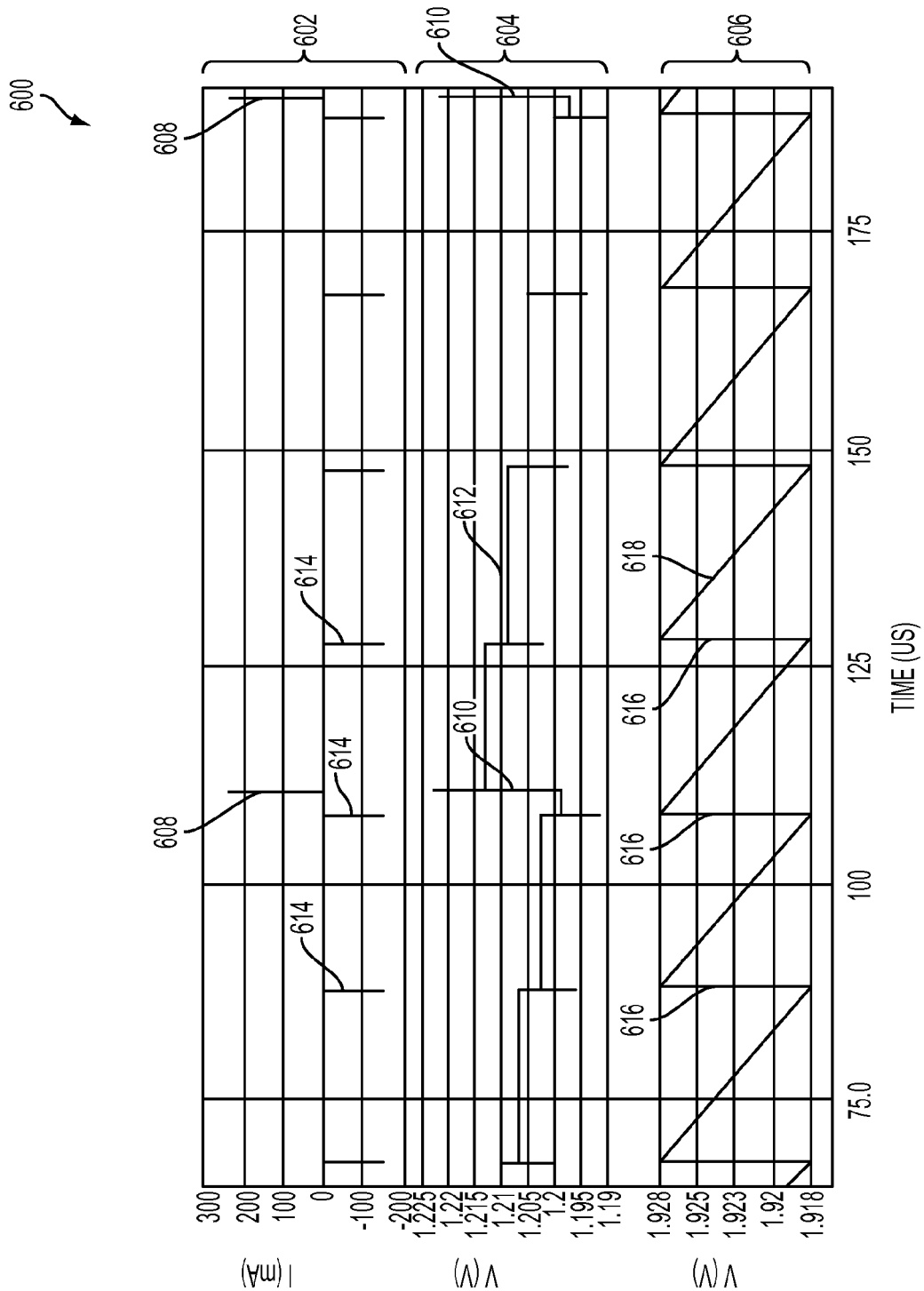
FIG. 6 shows simulation results according to an exemplary embodiment.

According to an exemplary embodiment, FIG. 6 shows a simulation output for the power management unit 500 shown in FIG. 5. The simulation output 600 can be broken down into three sections as follows: (1) a top section 602 which shows the inductor current over time, (2) a middle section 604 which shows the buck output voltage, e.g., $V_{sw}$ 526, over time and (3) the bottom section which shows the boost converter output voltage, e.g., OUT$_{boost}$ shown as point 538. Positive spikes 608 in the inductor current correspond to times when the buck converter 502 is using the common inductive element 506. This usage by the buck converter 502 of the common inductive element 506 is also reflected in the middle section 604 by positive steps 610 in the buck output voltage curve 612. Negative spikes 614 in the inductor current correspond to times when the boost converter 504 is using the common inductive element 506. This usage by the boost converter 504 is also reflected in the bottom section 606 by the positive steps 616 in the boost output voltage curve 618.

According to exemplary embodiments, the relatively low power modes of operation which the exemplary embodiments described herein support, e.g., cellular communication devices, cellular communication subsystems, battery powered tracking devices, and the like, can cause the switching converter(s) to operate in a discontinuous mode. Periodically, for very short intervals of time, e.g., 100 ns in a 10 μs time frame, the inductive element 506 can deliver an electrical charge to the capacitor 508 that supplies the load current, therefore the inductive element 506 does not always need to carry current for long periods of time rendering the inductive element 506 available for use.

According to an exemplary embodiment, a purely illustrative example of efficiency, for the embodiments described with respect to FIGS. 5 and 6, is now described. For this example, a supply voltage is 3.6V, the linear regulator 510 output is 1.8V, a linear regulator 510 load current is 600 μA, a linear regulator quiescent current is 20 µA and a current drawn from a supply is 620 µA. Additionally, the assumptions shown below in Table 1 are used.

TABLE 1

| Buck Converter Output Voltage | 1.2 V |
| Buck Converter Efficiency | 85% |
| Boost Converter Efficiency | 85% |

If all of the 600 µA load current is supplied by the boost converter(s) 504, the current drawn from the supply can be computed as shown in Equation (1) below.

$$600 \ \mu A \times \frac{1.8}{1.2} \times \frac{1}{0.8} \times \frac{1.2}{3.6} \times \frac{1}{0.8} = 468 \ \mu A \qquad (1)$$

According to this purely illustrative example, this can provides for a savings of 152 µA, which in a cellular subsystem can reduce the overall Discontinuous Reception 2 (DRX2) sleep mode power consumption by almost fifteen percent.

According to exemplary embodiments, an inductive element 506 can be used by multiple functional elements within a power management unit 500. According to an exemplary embodiment, on average a cellular subsystem operates on low power, also referred to as "sleep mode", for approximately 23 hours a day. Therefore, the step-down power converter, e.g., the buck converter 502, can run in sleep mode to ensure lower power consumption and higher efficiency using the exemplary embodiments described herein which allow for the inductive element 506 to be used in operating one or more step-up power converters, e.g., the boost converters 504.

Figure 7:
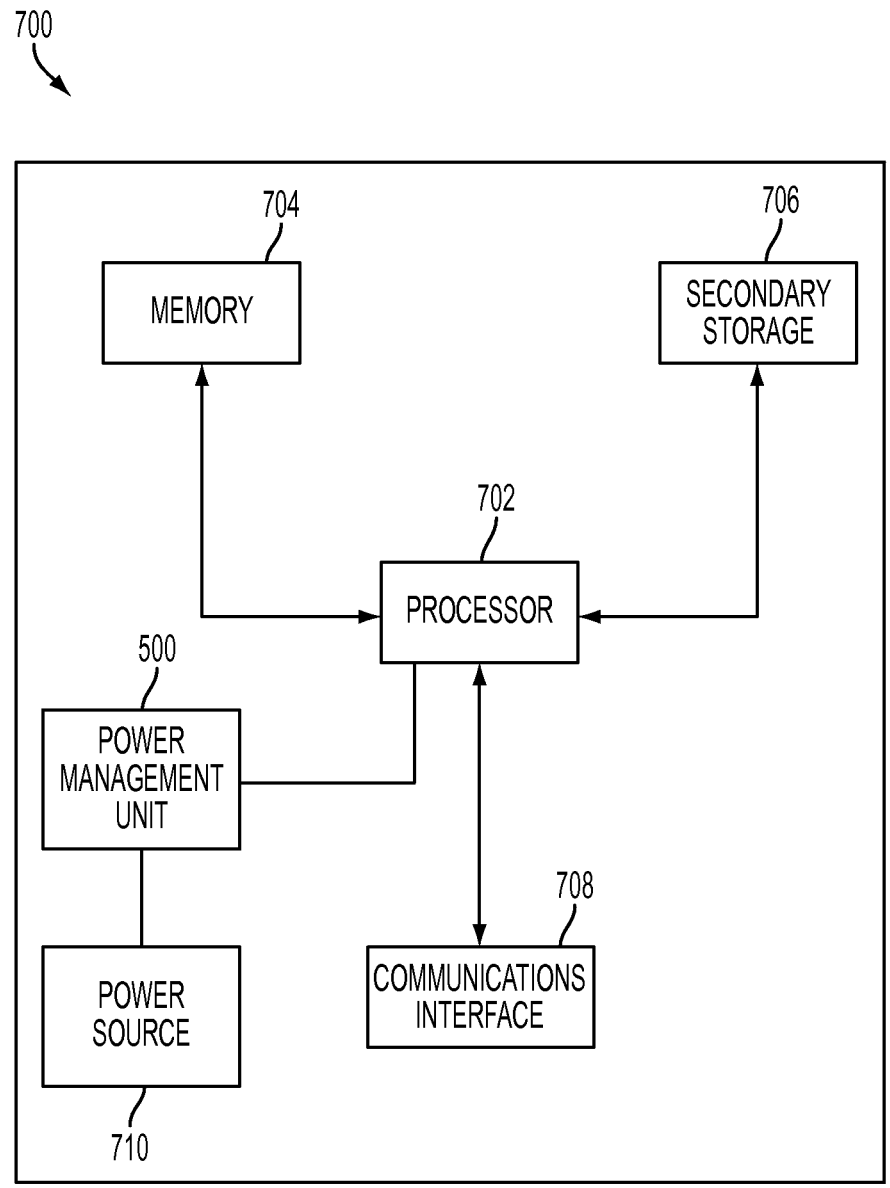
FIG. 7 illustrates a device according to exemplary embodiments.

The exemplary embodiments described above can allow a single inductive element to support multiple power converters within a power management system. An exemplary device 700, can be a, e.g., cellular communication devices, cellular communication subsystems, battery powered tracking devices, and the like, will now be described with respect to FIG. 7. The device 700 can include a processor 702 (or multiple processor cores), memory 704, one or more secondary storage devices 706, a communications interface, a power management unit 710 and a power source 712. The power management unit 710 can be any of, but is not limited to, the power management units 300, 400 and 500 as desired for device 700 to reduce the overall power consumption of the device 700.

Figure 8:
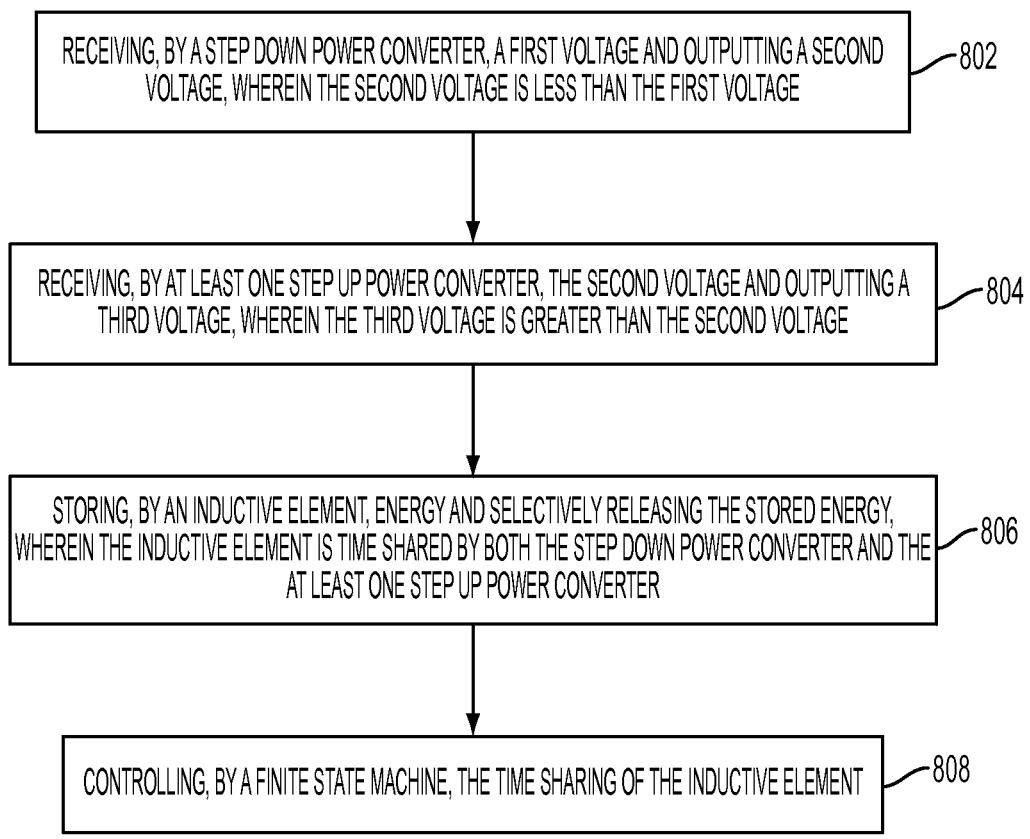
FIG. 8 is a flowchart illustrating a method according to exemplary embodiments.

An exemplary method for operating a power management unit is illustrated in FIG. 8. Therein, at step 802 receiving, by a step-down power converter, a first voltage and outputting a second voltage, wherein the second voltage is less than the first voltage; at step 804 receiving, by at least one step-up power converter, the second voltage and outputting a third voltage, wherein the third voltage is greater than the second voltage; at step 806 storing, by an inductive element, energy and selectively releasing the stored energy, wherein the inductive element is time shared by both the step-down power converter and the at least one step-up power converter; and at step 808 controlling, by a finite state machine, the time sharing of the inductive element.

Figure 9:
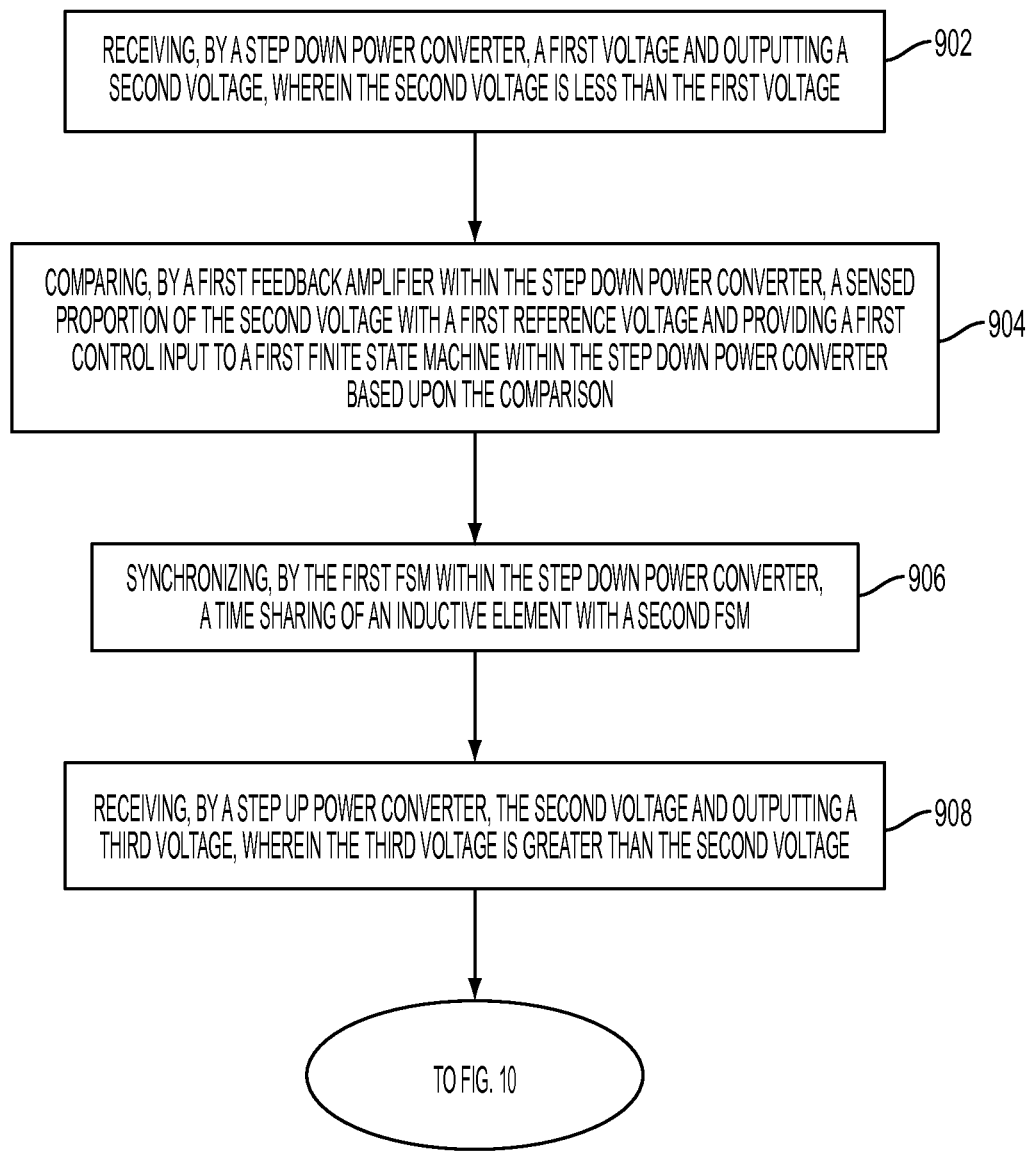
FIGS. 9-10 are a flowchart illustrating another method according to exemplary embodiments.
Figure 10:
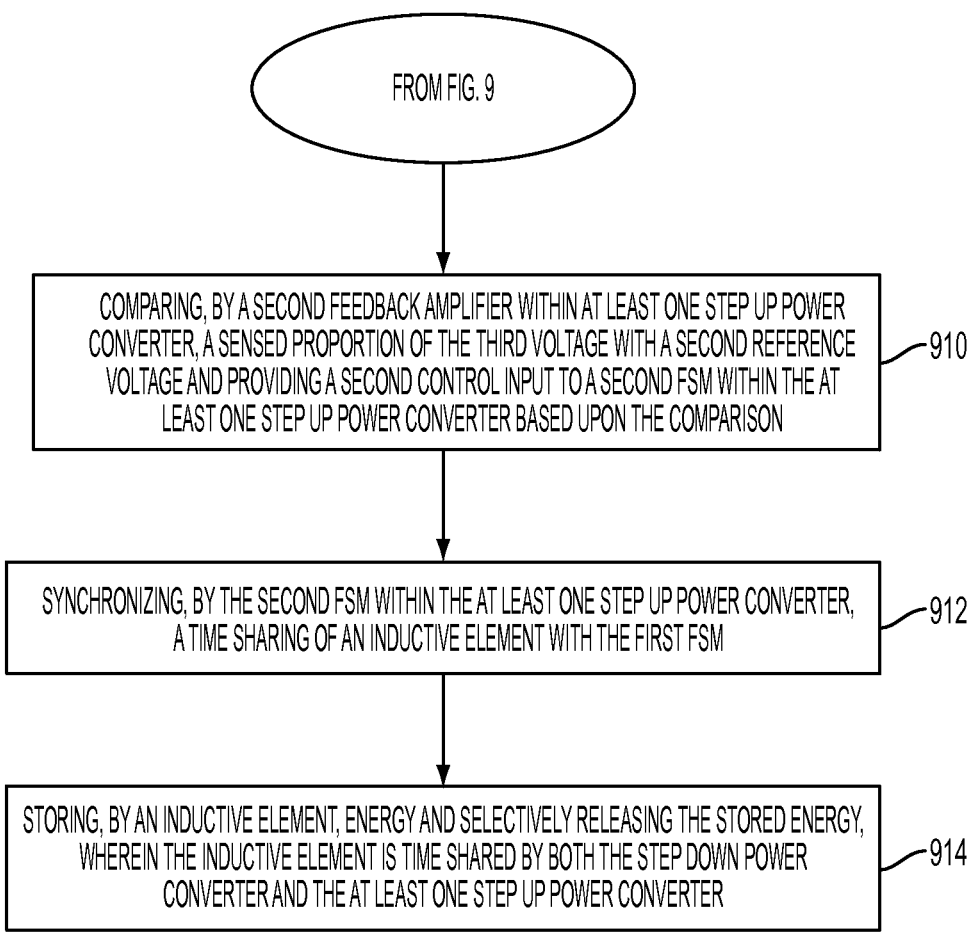

Another exemplary method for operating a power management unit is illustrated in FIGS. 9 and 10. Therein, at step 902 receiving, by a step-down power converter, a first voltage and outputting a second voltage, wherein the second voltage is less than the first voltage; at step 904 comparing, by a first feedback amplifier within the step-down power converter, a sensed proportion of the second voltage with a first reference voltage and providing a first control input to a first finite state machine within the step-down power converter based upon the comparison; at step 906 synchronizing, by the first FSM within the step-down power converter, a time sharing of an inductive element with a second FSM; at step 908 receiving, by a step-up power converter, the second voltage and outputting a third voltage, wherein the third voltage is greater than the second voltage; at step 910 comparing, by a second feedback amplifier within at least one step-up power converter, a sensed proportion of the third voltage with a second reference voltage and providing a second control input to a second FSM within the at least one step-up power converter based upon the comparison; at step 912 synchronizing, by the second FSM within the at least one step-up power converter, a time sharing of an inductive element with the first FSM; at step 914 storing, by an inductive element, energy and selectively releasing the stored energy, wherein the inductive element is time shared by both the step-down power converter and the at least one step-up power converter.

The use of the above described exemplary embodiments can allow for a power management unit which is capable of efficiently generating multiple voltage outputs from a single power source using a single inductor. Additionally, the use of the above described exemplary embodiments can allow for a power management unit which uses a relatively small area on a circuit board due to the reduction of components, e.g., reducing the quantity of inductors.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items. Skilled readers will readily acknowledge that these are provided to illustrate the teachings of the invention and should not be construed as the only possible implementations of the present invention.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A power management unit comprising:
   a step-down power converter configured to receive a first voltage and output a second voltage, wherein the second voltage is less than the first voltage, the step-down power converter including:
      a first feedback amplifier configured to compare a sensed proportion of the second voltage with a first reference voltage and configured to provide a first control input to a first finite state machine (FSM) based upon the comparison; and
      the first FSM configured to synchronize a time sharing of an inductive element with a second FSM;
   at least one step-up power converter configured to receive the second voltage and output a third voltage, wherein the third voltage is greater than the second voltage, the at least one step-up power converter including:
a second feedback amplifier configured to compare a sensed proportion of the third voltage with a second reference voltage and configured to provide a second control input to the second FSM upon the comparison; and
the second FSM configured to synchronize the time sharing of the inductive element with the first FSM; and
the inductive element connected to the step-down power converter and the at least one step-up power converter and configured to store energy and selectively release the stored energy, wherein the inductive element is time shared by both the step-down power converter and the at least one step-up power converter.

2. The power management unit of claim 1, further comprising:
a linear regulator connected to the at least one step-up power converter and configured to generate an output voltage.

3. The power management unit of claim 1, wherein the step-down power converter comprises:
a first switch which, when closed, outputs the second voltage to the at least one step-up power converter when a second switch is open.

4. The power management unit of claim 3, wherein the first FSM is further configured to send control signals to open and close the first and second switches.

5. The power management unit of claim 1, wherein the step-up power converter comprises:
a third switch which, when closed, outputs the third voltage from the at least one step-up power converter when a fourth switch is open.

6. The power management unit of claim 5, wherein the second FSM is further configured to send control signals to open and close the third and fourth switches.

7. The power management unit of claim 1, further comprising:
a capacitor connected to the inductive element and configured to receive and store an electrical charge.

8. The power management unit of claim 1, wherein at least one of the power converters operates in a discontinuous mode.

9. A method for operating a power management unit, the method comprising:
receiving, by a step-down power converter, a first voltage and outputting a second voltage, wherein the second voltage is less than the first voltage;
comparing, by a first feedback amplifier within the step-down power converter, a sensed proportion of the second voltage with a first reference voltage and providing a first control input to a first finite state machine (FSM) within the step-down power converter based upon the comparison;
synchronizing, by the first FSM within the step-down power converter, a time sharing of an inductive element with a second FSM;
receiving, by a step-up power converter, the second voltage and outputting a third voltage, wherein the third voltage is greater than the second voltage;
comparing, by a second feedback amplifier within at least one step-up power converter, a sensed proportion of the third voltage with a second reference voltage and providing a second control input to a second FSM within the at least one step-up power converter based upon the comparison;
synchronizing, by the second FSM within the at least one step-up power converter, a time sharing of the inductive element with the first FSM; and
storing, by the inductive element, energy and selectively releasing the stored energy, wherein the inductive element is time shared by both the step-down power converter and the at least one step-up power converter.

10. The method of claim 9, further comprising:
generating, by a linear regulator, an output voltage.

11. The method of claim 9, further comprising:
closing a first switch and opening a second switch in the step-down power converter which outputs the second voltage to the at least one step-up power converter.

12. The method of claim 11, further comprising:
sending control signals, by the FSM, to open and close the first and second switches.

13. The method of claim 9, further comprising:
closing a third switch and opening a fourth switch in the at least one step-up power converter which allows the third voltage to exit the at least one step-up power converter.

14. The method of claim 13, further comprising:
sending control signals, by the FSM, to open and close the third and fourth switches.

15. The method of claim 9, further comprising:
receiving and storing an electrical charge by a capacitor.

16. The method of claim 9, further comprising:
operating at least one of the power converters in a discontinuous mode.

17. A power management unit comprising:
a step-down power converter configured to receive a first voltage and output a second voltage, the step-down power converter including a first feedback amplifier configured to compare a sensed proportion of the second voltage with a first reference voltage;
at least one step-up power converter configured to receive the second voltage and output a third voltage, the at least one step-up power converter including a second feedback amplifier configured to compare a sensed proportion of the third voltage with a second reference voltage; and
an inductive element connected to the step-down power converter and the at least one step-up power converter and configured to store energy and selectively release the stored energy, wherein the inductive element is time shared by both the step-down power converter and the at least one step-up power converter.

18. The power management unit of claim 17, wherein the step-down power converter comprises:
a first switch which, when closed, outputs the second voltage to the at least one step-up power converter when a second switch is open.

19. The power management unit of claim 18, wherein the step-up power converter comprises:
a third switch which, when closed, outputs the third voltage from the at least one step-up power converter when a fourth switch is open.

20. The power management unit of claim 17, further comprising:
a capacitor connected to the inductive element and configured to receive and store an electrical charge.

21. A method for operating a power management unit, the method comprising:
receiving, by a step-down power converter, a first voltage and outputting a second voltage;
comparing, by a first feedback amplifier within the step-down power converter, a sensed proportion of the second voltage with a first reference voltage;

receiving, by a step-up power converter, the second voltage and outputting a third voltage, wherein the third voltage is greater than the second voltage;

comparing, by a second feedback amplifier within at least one step-up power converter, a sensed proportion of the third voltage with a second reference voltage; and storing, by an inductive element, energy and selectively releasing the stored energy, wherein the inductive element is time shared by both the step-down power converter and the at least one step-up power converter.

22. The method of claim 21, further comprising:
generating, by a linear regulator, an output voltage.

23. The method of claim 21, further comprising:
closing a first switch and opening a second switch in the step-down power converter which outputs the second voltage to the at least one step-up power converter.

24. The method of claim 23 further comprising:
closing a third switch and opening a fourth switch in the at least one step-up power converter which allows the third voltage to exit the at least one step-up power converter.

25. The method of claim 21, further comprising:
receiving and storing an electrical charge by a capacitor.

\* \* \* \* \*